United States Patent [19]

Lund et al.

[11] Patent Number: 4,808,872
[45] Date of Patent: Feb. 28, 1989

[54] ELECTRIC MACHINE WITH A SHEET METAL PACKET CARRYING A WINDING AND A METHOD OF MAKING SAME

[75] Inventors: Egon Lund, Sφnderborg; Poul Petersen, Nordborg, both of Denmark

[73] Assignee: Danfoss A/S, Nordborg, Denmark

[21] Appl. No.: 173,864

[22] Filed: Mar. 28, 1988

[30] Foreign Application Priority Data

Apr. 10, 1987 [DE] Fed. Rep. of Germany ....... 3712226

[51] Int. Cl.$^4$ .............................................. H02K 3/34
[52] U.S. Cl. ..................................... 310/215; 310/260
[58] Field of Search ................ 310/214, 215, 216, 260

[56] References Cited

U.S. PATENT DOCUMENTS

| | | | |
|---|---|---|---|
| 2,473,332 | 6/1949 | England | 310/215 |
| 2,778,964 | 1/1957 | Balke | 310/215 |
| 3,745,394 | 7/1973 | Mason | 310/215 |
| 3,909,648 | 9/1975 | Clark | 310/260 |
| 4,507,580 | 3/1985 | Obara | 310/214 |

FOREIGN PATENT DOCUMENTS 782057 11/1980 U.S.S.R. ............................. 310/260

Primary Examiner—Patrick R. Salce
Assistant Examiner—Marc S. Hoff
Attorney, Agent, or Firm—Wayne B. Easton; Clayton R. Johnson

[57] ABSTRACT

An electric machine that includes a stator having a sheet metal packet which has an end plate at each end, and insulating plates abutting against the end plates. The packet has radially inwardly opening winding grooves. Insulating plates are provided at the ends of the packet and have recesses that correspond to the grooves and ribs that form abutment faces against which winding liners provided in the grooves abut. The ribs are shaped such that the windings emerging from the grooves will not cut through the liners when bent sharply. The ends of the groove liners are shaped by thermal stamping to lie against the side faces of the ribs.

10 Claims, 5 Drawing Sheets

ELECTRIC MACHINE WITH A SHEET METAL PACKET CARRYING A WINDING AND A METHOD OF MAKING SAME

The invention relates to an electric machine with a sheet metal packet carrying a winding, particularly for the stator, of which the grooves are provided with a lining and the ends are each provided with a plate of electric insulating material having recesses adapted to the cross-sections of the grooves, the linings being fixed to the plates, as well as to a method for making such a machine.

In a known electric machine of this kind (DE-PS No. 11 05 978), the groove linings are so connected at both ends to a respective insulating plate at least partially covering the end face of the sheet metal packet that the outer faces of the insulation are planar. One method of manufacture is that the groove linings are made in one piece with the plate at one end and are introduced in the grooves of the sheet metal packet. They project so far beyond the end face of the sheet metal packet that they engage in the recesses of the second plate. Here, the ends of the linings are welded to the second plate by a die which can be heated. In the known apparatus, it is a considerable disadvantage that it is difficult to lead a flange with a plurality of groove linings into the grooves. More particularly, the mechanical assembly of the stators is thereby made very complicated.

It is also known (U.S. Pat. No. 2,778,964) to provide the ends of the groove linings with a bent-over collar which projects beyond the end of the sheet metal packet, thereby fixing the axial position of the groove lining. In this case, the collars project beyond the end of the sheet metal packet and in this way the leakage current path is increased between one part of the winding and the sheet metal stator. However, in this construction, the heads of the windings must project considerably beyond the sheet metal packet in order to maintain the standardised safety distances to the stator packet.

In an electric machine of the aforementioned kind, the invention is based on the problem of making constructional provisions enabling the use of smaller winding heads to save copper and yet meeting the requirements for leakage current spacings.

This problem is solved according to the invention in that the free ends of plates are provided with ribs extending continuously around the outlines of the grooves and that the side of the rib facing the wall of the groove forms an abutment face for a single liner inserted in each groove.

In this construction, at least some of the coil wires can be bent comparatively sharply about the adjacent rib immediately where they leave the groove and then led along near the end of the sheet metal packet. The ribs can be so dimensioned that the winding portions supported thereby have the required leakage current spacing (2.4 mm) from the sheet metal packet. The ribs ensure that the wires emerging from the covered grooves will not cut through the groove lining when bent sharply. Altogether, therefore, the connecting wires of the winding heads can be arranged very much closer to the end of the sheet metal packet than hitherto which leads to a considerable saving.

In particular, the groove lining extends up to the upper edge of the rib. In this way, the winding portions emerging from the groove and lying against the rib will likewise not be endangered by an excessively small leakage current spacing.

It is particularly advantageous in this connection for the ribs to have a cross-section with outwardly converging side faces. This provides a particularly good abutment face.

In particular, the rib cross-section between adjacent grooves may have substantially the shape of an equilateral triangle. Preferably, its height is larger than its width. This results in a rib shape which prevents an individual wire from being bent through an angle of almost 90° and thereby possibly becoming damaged.

Preferably, for the purpose of forming a continuous edge along the groove recesses, the width of the rib may be narrower than that of the radially extending webs of the insulating plate, so that the rib will be at a spacing from the wall of the groove. The edge forms a horizontal abutment in front of the oblique side faces of the ribs and, after thermal stamping, this gives a particularly good seating for the groove lining so that the latter is held securely axially. This ensures an even longer leakage current path.

Preferably, the groove lining is in the form of a sleeve extending along the wall of the groove, the ends of the sleeve facing away from the groove mouth being provided with self-blocking flaps. The otherwise conventional groove wedges can be omitted and the grooves are nevertheless kept closed so that none of the winding wires can be squeezed outwards. At the same time, the tool for pulling the winding in may be simpler and smaller and in particular have a smaller diameter so that more space is available for pulling the winding in and the winding heads at both sides of the stator packet can be made smaller. This still further reduces the copper requirement and makes it possible to make the motor still smaller.

Preferably, the flaps are the ends of the groove lining bent at an angle and their ends facing obliquely inwardly at the mouth of the groove lie against each other. The length of the flaps can be such that, when pressing from the inside to the outside in the direction of the mouth of the groove, the flaps cannot be swung past each other. This effectively prevents parts of the winding from being squeezed out.

Preferably, the wires of each winding portion are interconnected to keep their shape in such a way that the wire insulations are stuck to each other. With the very small winding heads which are here disposed close to the end faces of the stator packet, bandaging of the coil portions with cord is very difficult, if not impossible. To fix the wire insulations to each other by adhesion, one can, for example, use a known insulating lacquer which becomes adhesive on heating. This permits the winding heads to be kept axially shorter and yet fix them in place. A suitable lacquer for this purpose is, for example, Type SDW 5 from Messrs. Fujimura of Japan.

During manufacture, it is recommended for the ends of the groove lining which project from the grooves to be so shaped by thermal stamping that they lie against the side faces of the rib. This leads to very simple fixing of the groove linings.

Thermal stamping is preferably by means of heat piston deformation followed by cold piston pressing to fix the deformation. This process is simpler and presents fewer problems than, say, welding.

Preferred examples of the invention will now be described in more detail with reference to the drawings, wherein.

Figure 1:
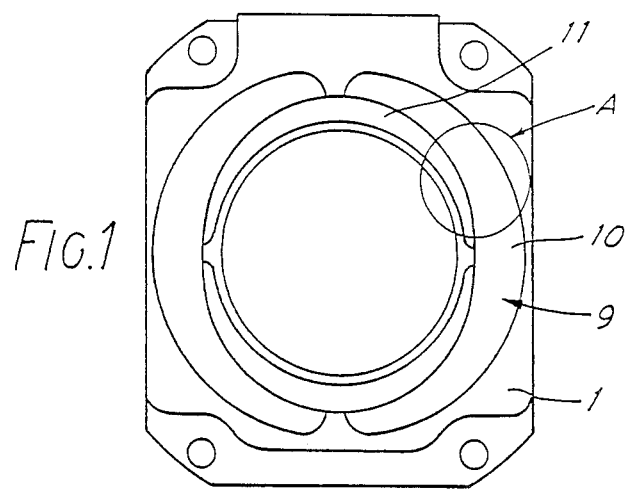
FIG. 1 is a plan view on to the end of a stator of a 2-pole electric asynchronous machine.
Figure 2:
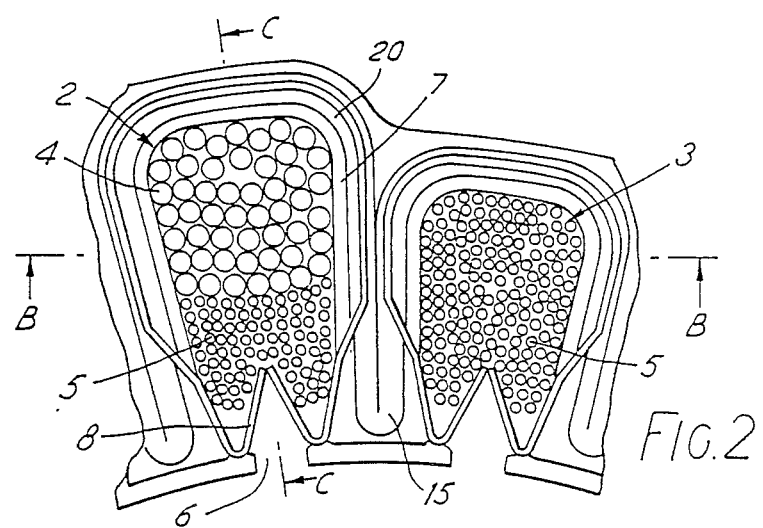
FIG. 2 is an enlarged plan view of the stator in the region of the circle A in FIG. 1.
Figure 3:
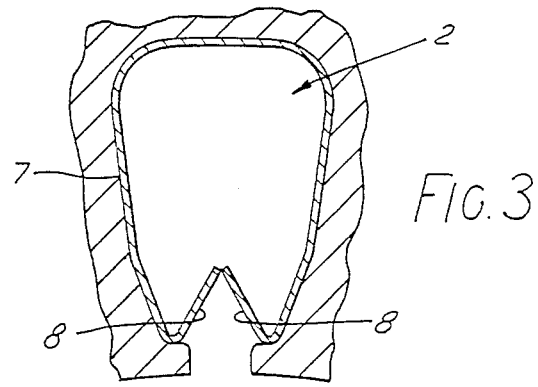
FIG. 3 is a cross-section through an as yet empty groove.
Figure 4:
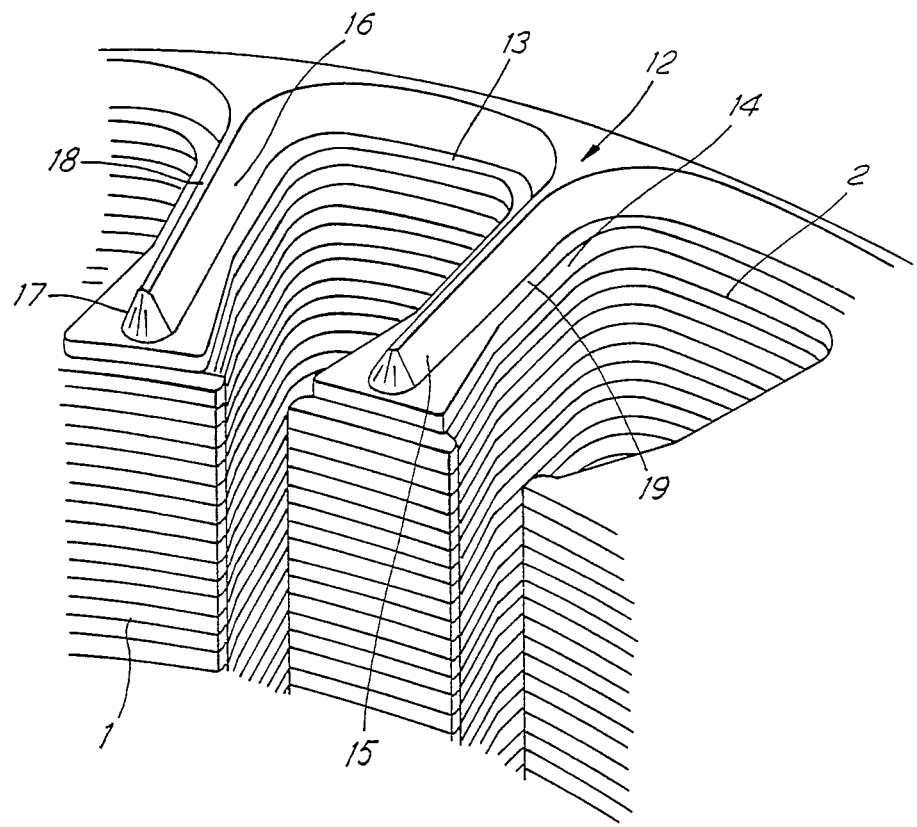
FIG. 4 shows part of the sheet metal packet with insulating plate.
Figure 5:
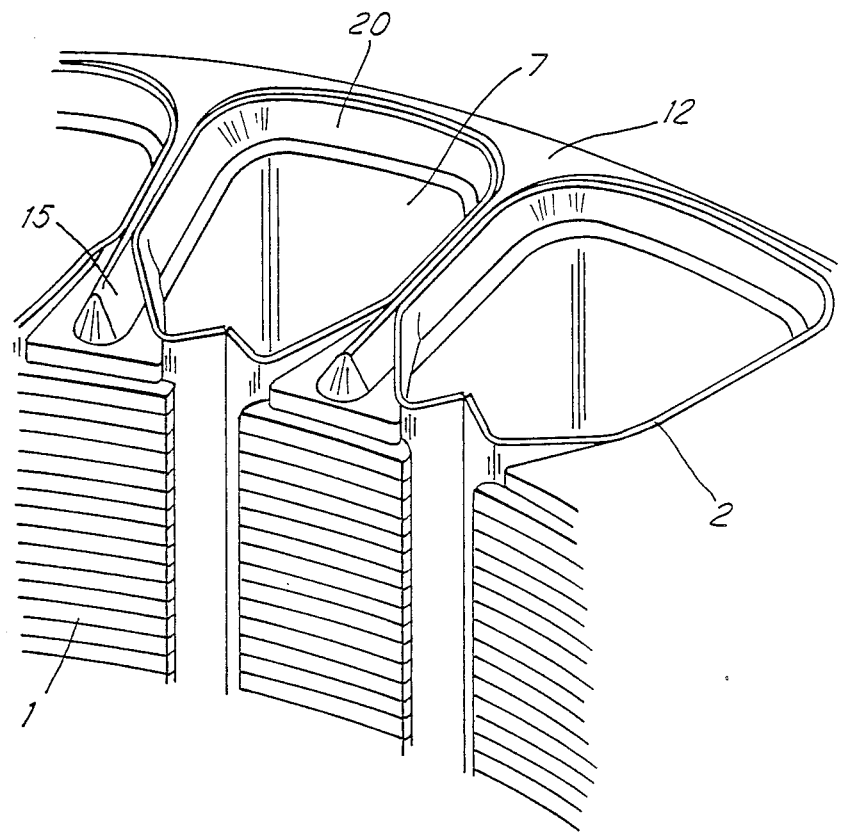
FIG. 5 shows the same part of the sheet metal packet after introducing the groove insulation.

The sheet metal packet 1 of a stator comprises a number of circumferentially spaced, axially extending grooves, for example 24 grooves, comprising larger grooves 2 and smaller grooves 3 as shown in FIG. 2. The windings consist of coils and part-coils. The grooves are as usual provided with coils 4 of a main winding, coils 5 of an auxiliary winding, or with both as is shown in FIG. 2. By means of a drawing-in machine, the coils are pulled in through the inlet gaps 6 of the grooves which open radially inwardly. A groove lining 7 comprises radially inner self-blocking flaps 8 which converge toward one another in a radial outward direction and have abutting terminal edge portions to prevent the individual wire out of the groove again. The windings 4,5 held together by adhesive lacquer are securely held in place by the tapered shape of the grooves. One can therefore dispense with the conventional groove wedges. The individual coils of the grooves are interconnected outside the sheet metal packet 1 by way of a winding head 9. There are head portions 10 of the main winding and head portions 11 of the auxiliary winding.

Figure 7:
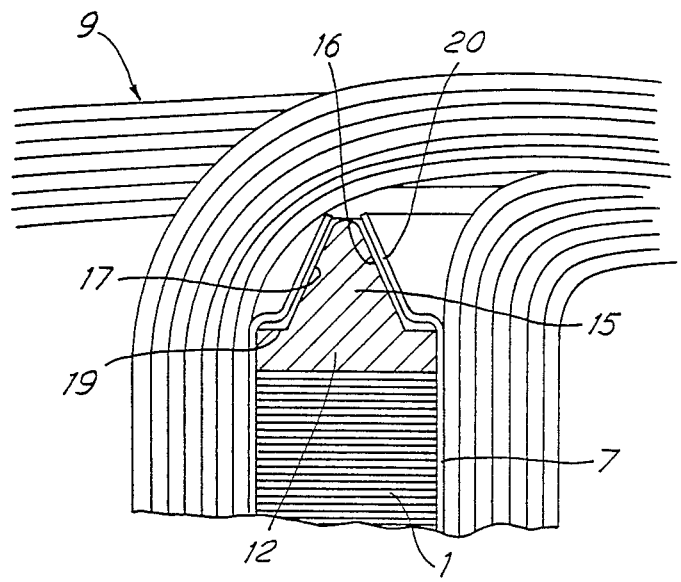
FIG. 7 is a part-section along the line B—B in FIG. 2.
Figure 8:
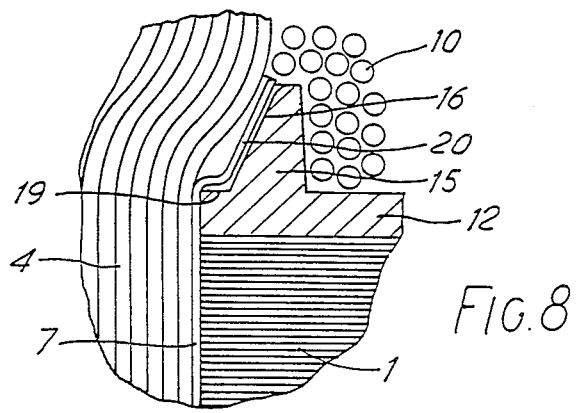
FIG. 8 is a part-section along the line C—C in FIG. 2.

At the ends of the sheet metal packet 1, there is a plate 12 of electrically insulating material. It comprises recesses 13 corresponding to the cross-section of the associated groove 2. The plate 12 comprises radial webs 14 of a width corresponding to the spacing between adjacent grooves. The ribs 15 extend along the webs, ie., between adjacent grooves. Without any interruption, they follow the outline of the recess 13. The side faces 16 or 17 of the rib 15 extend obliquely outwardly so that a supporting face or edge 18 is produced at the top. Two oblique side faces converge towards each other on the web 14 between two grooves (FIG. 7). Over the rest of the rib 15, only one oblique side face is required whereas the outside of the rib can fall off steeply (FIG. 8).

In the present example, the rib 15 has a cross-section in the vicinity of the web 14 in the shape of an equilateral triangle. However, other cross-sections are also possible, for example, trapezoidal cross-sections, rounded cross-sections or the like. Since the base surface of the ribs 15 is narrower than the web 14, a continuous edge 19 is formed. In one example, the webs 14 have a thickness of 1 mm and a width of 3 mm whilst the ribs have an additional height of 2 mm and a width at the base surface of 1 mm.

The individual grooves 4,5 are, as already mentioned, each provided with a lining 7 of electrically insulating material. The end sections 20 projecting out of the sheet metal packet 1 are splayed and, by means of thermal treatment, adapted to the shape of the ribs 15 and the edge 19 over part of their length. This is brought about by a heated piston pressing the end sections 20 against the rib and edge, followed by treatment with a cold piston which fixes the deformation. The pistons have an end adapted to the profile of the plate 12. The end sections 20 extend up to the edge 18 of the ribs 15. These provisions are made at both sides of the sheet metal packet. The windings can then be inserted.

Figure 6:
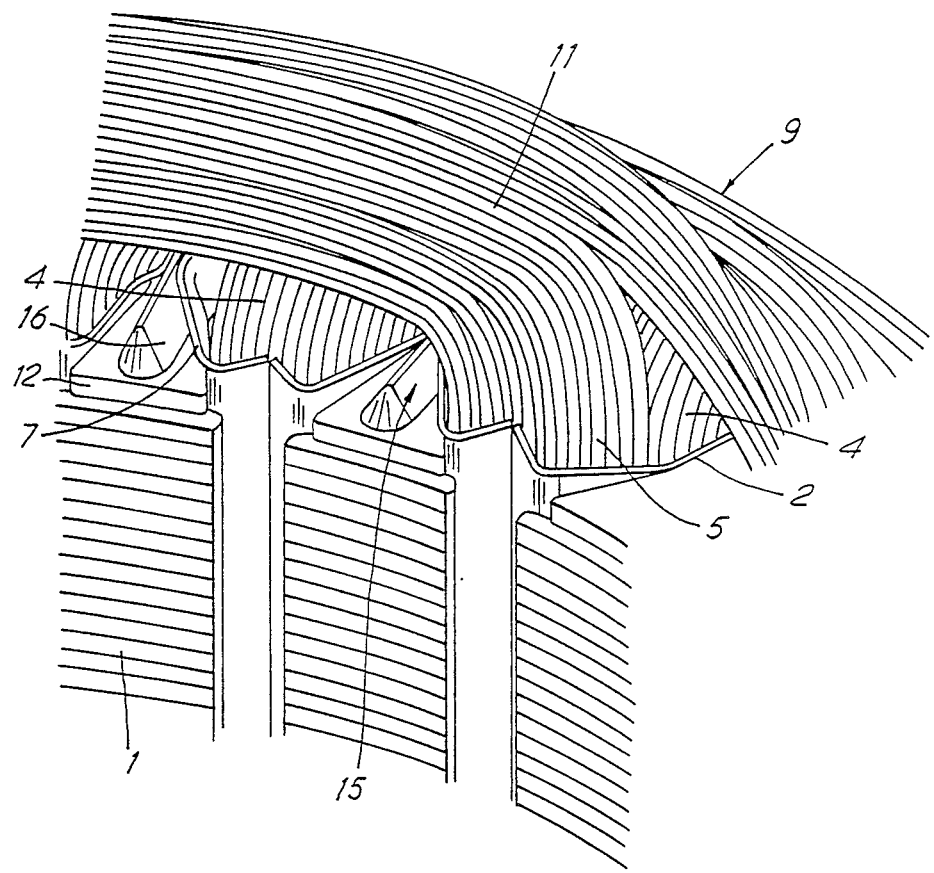
FIG. 6 shows the same part of the sheet metal packet after introducing the winding.

As shown in FIG. 6, a coil 4 of the main winding and a coil 5 of the auxiliary winding emerge from the groove 2. The coil 5 of the auxiliary winding is sharply bent over the adjacent rib 15. By reason of the splayed part 20 of the groove lining 7 and the oblique side face 16 of the rib, this leads to a gradual deflection despite the small space that is available. The coil 4 of the main winding is deflected rearwardly so that it leaves at the outer end of the groove. By means of the ribs 15, the coil portions 11 of the winding head 9 are held at such a spacing from the end face of the sheet metal packet 1 that the deflection of the parts 4 presents no problem. A sharp deflection of the individual parts of the coils at a single edge could otherwise result in cutting through the plastics foil of the groove lining 7 at the place of bending. What is particularly important is that the required spacing for the leakage current between the winding and the iron of the packet 1 is maintained at, for example, 2.4 mm.

Accordingly, the winding head 9 can be kept extremely flat and therefore much copper can be saved.

The wires of the winding are insulated with a lacquer which, when heated beyond a predetermined limiting value, becomes tacky. A suitable adhesive lacquer is, for example, Type SDW 5 from Messrs. Fujimura of Japan. When winding the stator packet 1, the head portions 10 and 11 of the winding head 9 are aligned and then the entire arrangement is heated beyond the limiting value. This causes the insultations to adhere to each other to result in a compact unit.

We claim:

1. An electric machine having a stator that includes an axial sheet metal packet, the packet including end plates and defining a plurality of circumferentially spaced winding grooves, an electric insulating material plate abutting against the adjacent end plate and having recesses extending therethrough of shapes that correspond to the adjacent grooves, a liner in each groove and fixed to the insulating plates, each insulating plate having a continuous rib extending axially outwardly in a direction away from the adjacent end plate and continuously around the outline of the adjacent groove, the rib having a surface providing an extension of the adjacent groove and an abutment face for the liner that is extended in the respective groove.

2. A machine according to claim 1, characterized in that the rib has an axial outer edge and that each liner extends axially closely adjacent to said edge.

3. A machine according to claim 1, characterized in that the rib has a first portion extending between circumferentially adjacent grooves and being of a cross-section to provide surfaces that converge in a direction axially away from the adjacent end plate, the converging surfaces including the first mentioned rib surface.

4. A machine according to claim 3, characterized in that the rib portion in circumferential cross section substantially has the shape of an equilateral triangle.

5. A machine according to claim 1, wherein the packet has wall portions defining the grooves, the rib having a rib portion extending between adjacent grooves, the rib portion having circumferentially opposite abutment surfaces that include the first mentioned rib surface, the insulating plate having a radially extending web portion on each circumferential side of the rib portion that extends circumferentially between the rib portion and the wall portion of the adjacent groove whereby the rib portion is circumferentially spaced from each of the grooves.

6. A machine according to claim 5, characterized in that each liner is in the form of a sleeve, extends axially outwardly of the respective groove wall portion, and has a radially outer wall portion and radially inner self blocking flaps that extend radially toward the sleeve outer wall portion.

7. A machine according to claim 6 wherein winding wire portions are located within the sleeves, characterized in that the blocking flaps converge toward one another in a radial outward direction to have terminal edge portion abut against one another for maintaining the winding wire portions within the sleeve.

8. A machine according to claim 6 wherein the winding wire portions are interconnected and have insulation adhering wire portions to one another.

9. An electric machine having a stator that includes an axial extending sheet metal packet, the packet including an axial end plate and having wall portions that define a plurality of axial extending, circumferentially spaced, radially inwardly opening grooves, including a first groove and a circumferentially adjacent second groove, an electric insulating material plate abutting against the end plate, extending axially outwardly of the end plate and having a plurality of recesses extending axially therethrough and opening radially inwardly, the recesses including a first and a second recess opening to the first and second groove and in cross section being of a shape substantially the same as the cross sectional shape of the first and second groove respectively, the insulating plate including a web portion abutting against the end plate and having a web part extending circumferentially between the first and second recesses and being of circumferential dimensions substantially the same as the corresponding spacing of the first and second grooves and a rib part joined to the web part to extend axially outwardly thereof, the rib part having circumferentially opposite surfaces that converge axially outwardly in a direction away from the web part and being of maximum circumferential dimensions narrower than the corresponding dimensions of the web part and a separate winding liner in each groove and abutting against the circumferentially adjacent rib part surface.

10. The machine of claim 9 wherein the liners have axial outer ends and winding wires extend axially outwardly of the grooves and are bent over the axial outer ends and insulating plate, characterized in that the wall portions include wall parts radially outwardly of the radially inwardly openings of the grooves, and that the insulating plate includes rib means extending continuously around the grooves other than where the grooves open inwardly for preventing the wires cutting through the liners where the wires are bent.

* * * * *